O. WINGREEN.
FERTILIZER AND SEED DISTRIBUTER.
APPLICATION FILED APR. 10, 1909.
926,160.
Patented June 29, 1909.
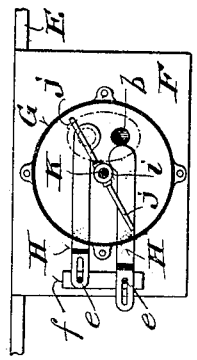
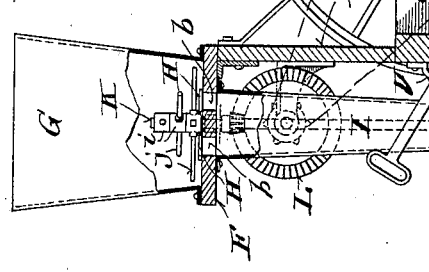
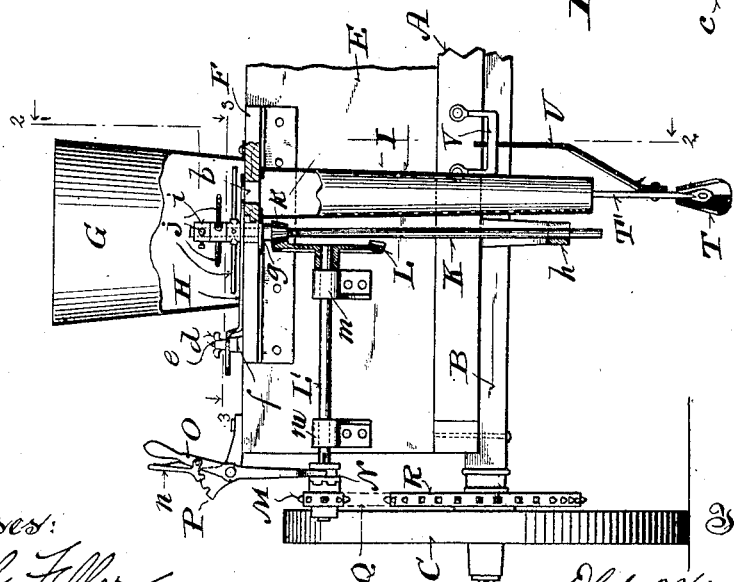
THE NORRIS PETERS CO., WASHINGTON, D. C.

UNITED STATES PATENT OFFICE.

OLOF WINGREEN, OF MOUNT PLEASANT, WISCONSIN.

FERTILIZER AND SEED DISTRIBUTER.

No. 926,160.   Specification of Letters Patent.   Patented June 29, 1909.

Application filed April 10, 1909. Serial No. 489,150.

*To all whom it may concern:*

Be it known that I, OLOF WINGREEN, a citizen of the United States, and resident of Mount Pleasant, in the county of Racine and State of Wisconsin, have invented certain new and useful Improvements in Fertilizer and Seed Distributers; and I do hereby declare that the following is a full, clear, and exact description thereof.

My invention consists in what is hereinafter particularly set forth with reference to the accompanying drawings and pointed out in the claims of this specification, its object being to provide simple, economical and efficient distributers for powdered commercial fertilizers or various seeds in rows or broadcast at the will of the operator, and if in rows to provide for varying the width between rows, each distributer being provided with adjustable furrow openers that may be readily elevated out of working position, stirrers for agitating the fertilizer or seed in hoppers for same and means for controlling feed of said fertilizer or seed.

Figure 1 of the drawings represents a rear elevation of a portion of a distributer in accordance with my invention partly broken away; Fig. 2, a sectional view of the same indicated by lines 2—2 in Fig. 1; Fig. 3, a horizontal section on the plane indicated by line 3—3 in said Fig. 1; Fig. 4, a partly sectional elevation of a detail of the machine, and Fig. 5, a horizontal section of another detail of said machine, indicated by line 5—5 in Fig. 2.

Referring by letter to the drawings, A indicates a rectangular frame mounted on an axle B for wheels C, and a draft-tongue D is connected to the frame, the whole forming a truck provided with a rear riser E for a rearwardly extending shelf F upon which a pair of hoppers are mounted equidistant from the draft-line of the truck, only one G of the hoppers being shown, and said riser and shelf are suitably braced.

Within each hopper, the shelf F is provided with feed-openings $b$ for which cut-off slides H are provided, the adjustment of the slides serving to regulate the flow of material from said hopper, and depending from said shelf in register with said feed-openings is a preferably downwardly tapered spout I for said material. For the purpose hereinafter specified, an elbow nozzle J may be detachably connected to the lower end of the spout, as shown in Fig. 4, a set-screw $c$ therewith serving as the securing means, and thumb-nuts $d$ are employed on stud-pins $e$ of a plate $f$ on the shelf F to hold the slides H in adjusted position, said slides being provided with slots engaged by said pins.

The shelf F and the truck-frame are provided with bearings $g$, $h$, for a vertical spindle K that extends up into the hopper, and fast on the upper end of said spindle are collars $i$ having stirring arms $j$ radiating therefrom, the collars being set so as to stagger the arms of each collar with respect to those of the other collars.

Fast on the spindle adjacent to its upper bearing is a bevel gear pinion $k$ in mesh with a bevel-gear wheel L, on a shaft L' for which the riser E is provided with bearings $m$, and loose on the outer end of the shaft is a sprocket-wheel M having a clutch-hub for the engagement of a clutch-block N splined on said shaft. A spanner-lever O employed in connection with the clutch-block is fulcrumed in connection with a bracket P fastened to the riser E and a spring-controlled latch $n$ in connection with the bracket is engageable with rim-notches of said bracket to hold the clutch-block in adjusted position.

The sprocket-wheel M is for engagement with a link-belt Q for which a similar wheel R is fast on the hub of the adjacent truck-wheel.

Bolted in slidably adjustable connection with the front beam of the truck is a bracket S from which the shank T' of a furrow-opener T is pivotally suspended, and pivotally secured at one end to said shank is a rack-rod U engageable with a stop-yoke V attached to the rear beam of said truck, whereby provision is had for regulating the depth of furrow or for swinging said furrow-opener up out of working position.

As shown in Fig. 2, a broad-cast distributer disk W may be detachably secured on the lower end of the spindle K, by a set-screw $p$, to be in the path of material descending the chute I aforesaid.

For drilling in fertilizer or seed, each furrow-opener T of the machine is adjusted to plow the desired depth, both furrow-openers (one of which is not shown) being also adjusted to regulate the distance between rows. If each furrow is directly under a spout I of the machine, the nozzle J may not be employed, but if employed it is adjusted to drop the fertilizer or seed in said furrow. On the other hand if the furrow-openers are adjusted to have the distance between furrows greater or less than the distance between spouts, then the nozzle J of each spout is adjusted in connection with the same to drop said fertilizer or seed in the adjacent furrow.

For broadcast fertilizer or seed distribution, the nozzle J is detached from each spout I and a disk similar to the one W secured on the lower end of the spindle K adjacent to said spout, and in any organization of my machine the feed of the contents of each hopper G is regulated as to quantity by the adjustable cut-off slides H aforesaid.

I claim:

1. The combination of a truck provided with a rear riser, a rearwardly extending shelf in connection with the riser and provided with feed-openings, adjustable cut-offs for the openings, a hopper mounted on the shelf to inclose the openings therein, a depending spout in register with said openings, a stirrer within the hopper, clutch-controlled gearing connecting the stirrer with a wheel of the truck, and a furrow-opener in laterally adjustable suspension from said truck ahead of the spout.

2. The combination of a truck provided with a rear riser, a rearwardly extending shelf in connection with the riser and provided with feed-openings, adjustable cut-offs for the openings, a hopper mounted on the shelf to inclose the openings therein, a depending spout in register with said openings, a stirrer within the hopper, clutch-controlled gearing connecting the stirrer with a wheel of the truck, and a furrow-opener in pivotal and laterally adjustable suspension from said truck ahead of the spout.

3. The combination with a truck, a hopper carried by the truck, means regulating the escape of the contents of the hopper, a stirrer in said hopper, means for operating the stirrer, a depending spout into which said contents of the hopper are discharged, an elbow nozzle in rotary adjustable connection with the lower end of the spout, and a furrow-opener in pivotal and laterally adjustable suspension from the truck ahead of said spout.

4. The combination of a truck, a force-feed hopper carried by the same, a delivery spout depending from the hopper, means controlling feed of material from hopper to spout, a bracket in adjustable connection with the truck at right-angles to its draft, a furrow-opener having a shank in pivotally adjustable connection with the bracket ahead of said spout, a rack-bar in pivotal connection with said shank, and a bar-engaging yoke attached to the truck.

In testimony that I claim the foregoing I have hereunto set my hand at Racine in the county of Racine and State of Wisconsin in the presence of two witnesses.

OLOF WINGREEN.

Witnesses:
C. R. CARPENTER,
B. R. JONES.